Oct. 13, 1953 E. F. MOSER 2,654,955
MEASURING APPARATUS
Filed July 6, 1950 3 Sheets-Sheet 1
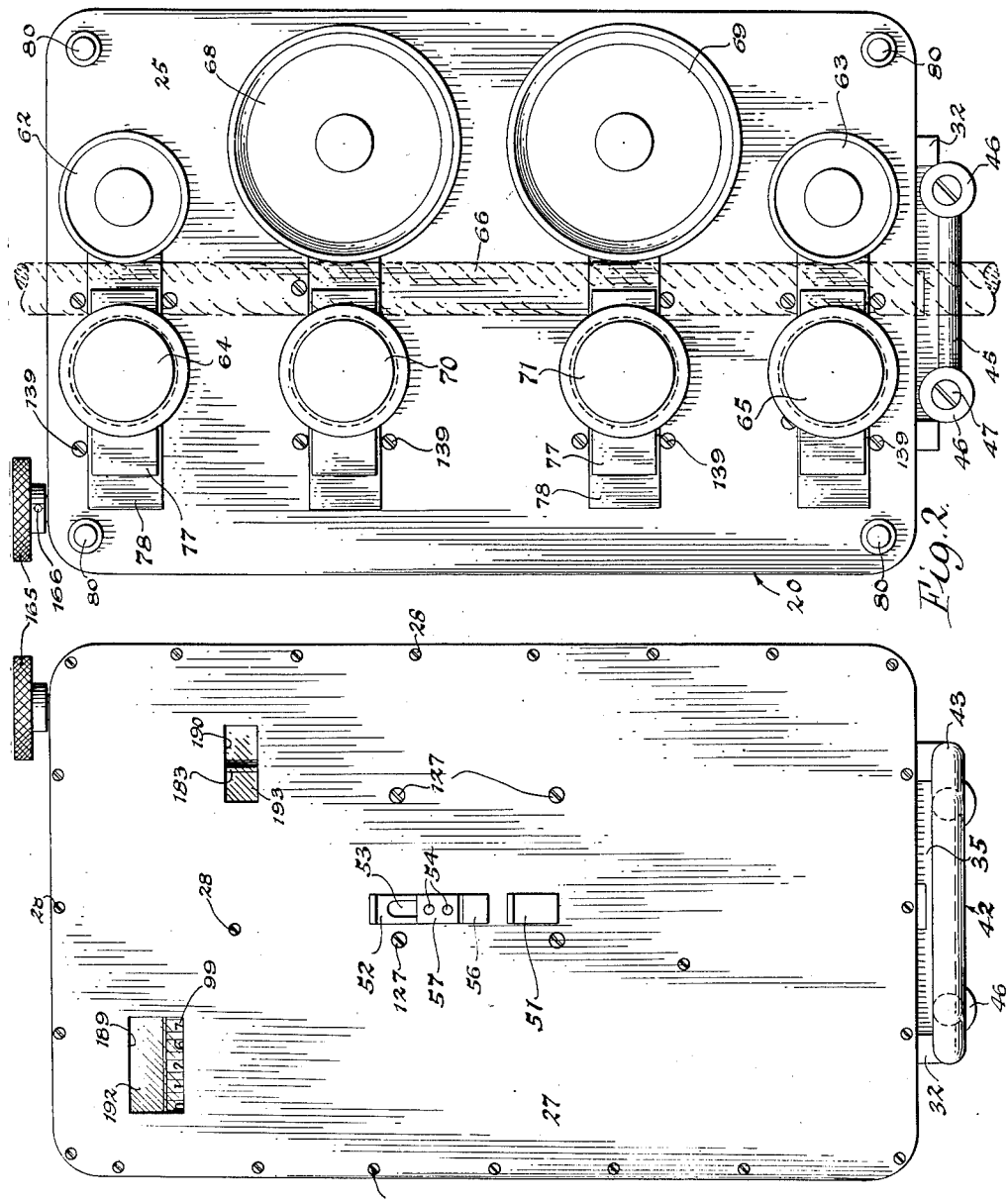
INVENTOR.
Edward F. Moser
BY
Popp and Sommer
ATTORNEYS Oct. 13, 1953     E. F. MOSER     2,654,955
MEASURING APPARATUS
Filed July 6, 1950     3 Sheets-Sheet 2
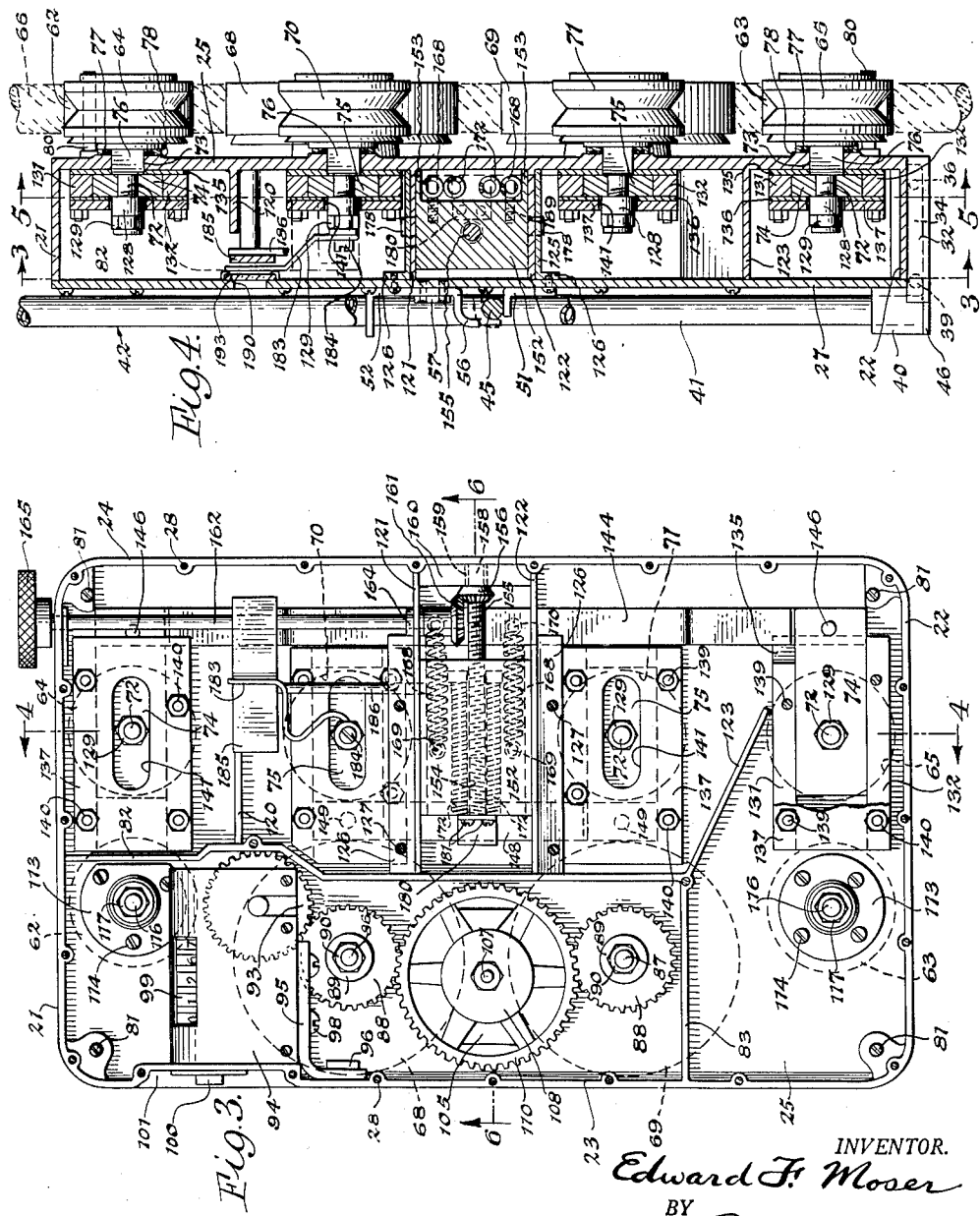
INVENTOR.
Edward F. Moser
BY
Popp and Sommer
ATTORNEYS Oct. 13, 1953            E. F. MOSER            2,654,955
MEASURING APPARATUS
Filed July 6, 1950            3 Sheets-Sheet 3
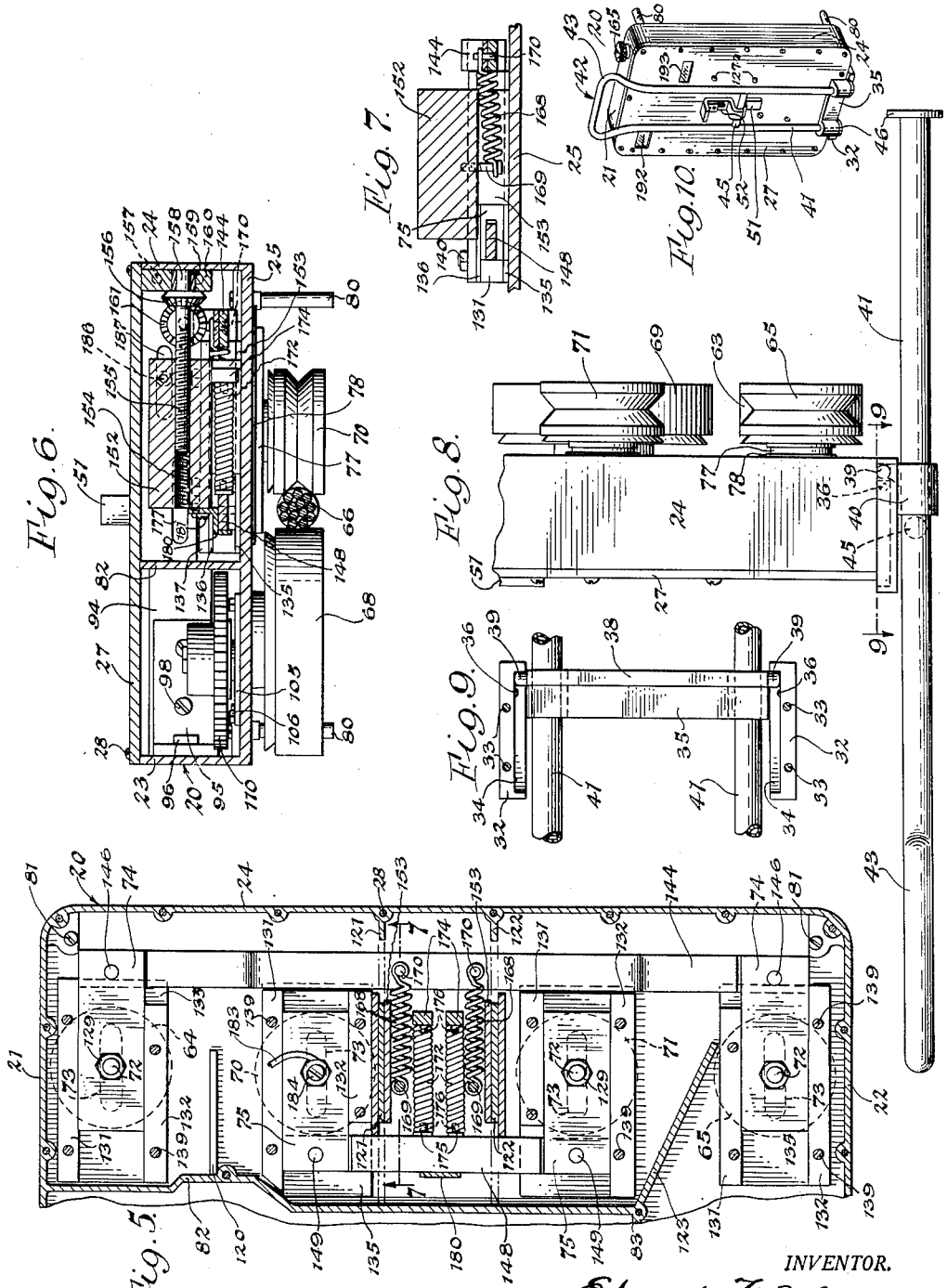
INVENTOR.
Edward F. Moser
BY
Popp and Sommer
ATTORNEYS Patented Oct. 13, 1953

2,654,955

UNITED STATES PATENT OFFICE 2,654,955

MEASURING APPARATUS

Edward F. Moser, Kane, Pa.

Application July 6, 1950, Serial No. 172,299

18 Claims. (Cl. 33—134)

This invention relates to measuring apparatus and particularly to such apparatus which is adapted and intended for use in determining the depth of wells by measuring the length of a rope or cable used therein.

It is an object of the present invention to provide measuring apparatus of the character described which is simple and inexpensive but is rugged, reliable and accurate.

Another object of the invention is to provide measuring apparatus of the character described which is easily portable so as to be used in different locations.

A further object of the invention is to provide measuring apparatus of the character described which neither requires elaborate or complicated mountings nor special devices for attachment to a well casing, but is so designed as merely to rest on the top of a well casing.

Still another object of the invention is to provide measuring apparatus of the character described in which the cable or line being measured is held under a constant predetermined tension which is independent of the diameter of the cable.

Additional objects of the invention are to increase the accuracy of measuring apparatus of the character described by providing rotatable guides which cause the cable or rope to pass through the device in a straight line and to provide means for permitting passage of cable splices or joints through the apparatus without interfering with the accuracy of the measurement.

Still further objects and advantages of the measuring apparatus of the present invention will be apparent from the following description taken in conjunction with the accompanying drawings in which:

Figure 1 is a front elevational view of measuring apparatus embodying the invention of the present application with the apparatus in the position assumed in use;

Figure 2 is a rear elevational view of the measuring apparatus shown in Figure 1;

Figure 3 is a vertical sectional view on the line 3—3 of Figure 4 with portions of some of the elements broken away for clarity of illustration, and with the carrying handle mounting removed;

Figure 4 is a vertical sectional view on the line 4—4 of Figure 3 with a portion of the carrying handle broken away to show the details of the handle-holding latch;

Figure 5 is a fragmentary, vertical sectional view similar to Figure 3 on the line 5—5 of Figure 4;

Figure 6 is a transverse sectional view on the line 6—6 of Figure 3;

Figure 7 is a horizontal, sectional detailed view on the line 7—7 of Figure 5;

Figure 8 is a fragmentary side view of the measuring apparatus shown in Figure 1 with the handle in the same position as shown in Figure 1;

Figure 9 is a fragmentary detailed view of the handle mounting; and

Figure 10 is a perspective view on a reduced scale of measuring apparatus embodying the present invention with the handle in position for carrying the apparatus.

As shown in the drawings, measuring apparatus embodying the invention of the present application comprises a box-like housing consisting of a casing 20 having a top 21, a bottom 22, sides 23 and 24, a back 25, and a flat cover 27 adapted to close the open front of the casing 20 and to be removably attached thereto by a plurality of screws 28 which pass through the cover and threadedly engage in holes in the casing. A pair of spaced parallel guides 32 are removably attached as by screws 33 to the bottom 22 of the casing 20. The guides 32 are provided with longitudinally extending recessed or cut-out portions 34 in their facing sides adjacent the bottom 22. A handle support 35 is provided with a laterally projecting, preferably integral, flange 38. The ends of the flange 38 are reduced to form rounded, outwardly projecting pivots 39 that are received within the cut-out portions or recesses 34 of the guides 32 and are adapted for movement longitudinally thereof and pivotally therein. On the opposite side of the handle support 35 from the flange 38 there are provided a pair of spaced tubular projections 40 adapted to slidably receive the parallel legs 41 of a handle 42. The legs 41 are joined intermediate their length by a crossbar 45, preferably permanently attached thereto, and each leg is provided at its outer end with an enlarged washer 46 which is held in place by a screw 47.

When the handle 42 is in raised position, as shown in Figures 4 and 10, the pivots 39 are at the forward ends of the recesses 34 and the washers 46 are in contact with the bottoms of the tubular, sleeve-like projections 40. The flared grip 43 of the handle 42 projects vertically beyond the top 21 of the casing 20 and provides convenient means for grasping and carrying the measuring apparatus. When the handle 42 is to be used for carrying purposes it is preferably held in vertical position by suitable retaining means.

As best shown in Figures 1, 4 and 10, such retaining means may comprise a stationary angle plate 51, the top, outwardly projecting portion of which is adapted to support the crossbar 45 of the handle 42, and a slide 52. The latter is provided with a slot 53 through which there extend from the cover 27, a plurality of rivets 54 which guide the slide and permit limited vertical movement thereof toward and away from the angle plate 51. The slide 52 is provided at its lower end with an outwardly extending hooked portion 56 which engages the outer side of the crossbar 45 when the slide is in its lower position and thus prevents displacement of the handle. A head 57 is provided on the rivets 54 to retain the slide 52 in place.

When the measuring apparatus is to be used, the handle 42 is swung downwardly on the pivots 39 and the legs 41 thereof are pushed longitudinally through the tubular projections 40 until the crossbar 45 engages the projections, the pivots 39 then being at the extreme right ends of the recesses 34, as shown in Figures 8 and 9. In each of the guides 32 a spring mounted ball 36 is provided which obtrudes through an orifice into the recess 34. The balls 36 serve, when the pivots 39 are moved to the extreme rear ends of the recesses 34, to yieldably retain the pivots in that position while permitting pivotal movement thereof. The crossbar 45 is so located on the handle 42 that, in the position just described, the housing of the measuring apparatus is over the center of balance of the handle.

When the handle 42 is in the position shown in Figures 8 and 9 it may serve as a base by which the measuring apparatus may be supported on the top of the casing of a well the depth of which it is desired to measure. It will be seen that because of the pivotal movement permitted between the housing and the handle by the construction above-described, the measuring apparatus is capable of considerable freedom of movement and may thus adapt itself to lateral movement of the cable passing between the rollers thereof. By thus "floating" on the cable, measuring apparatus embodying the herein-described invention avoids the tendency to inaccuracy which exists in rigidly mounted devices of this character which restrain free movement of the cable.

On the back 25 of the casing 20 the novel measuring apparatus of the present invention is provided with four pairs of wheels arranged in two vertical series and adapted to rotate around parallel axes. The position of one wheel of each pair is fixed while the other wheel of each pair is adapted for movement bodily horizontally toward and away from the fixed wheel of each pair. The top and bottom fixed wheels 62 and 63, respectively, are provided with flat peripheral faces and, with their associated horizontally movable guide wheels or rollers 64 and 65 serve to center the cable 66 which is to be measured and bring it in alignment with the peripheries of the measuring wheels 68 and 69.

The upper and lower measuring wheels 68 and 69, respectively, are located between the centering wheels 62 and 63, are of larger diameter than the centering wheels, and also have flat peripheral faces. The measuring wheels 68 and 69 are associated with horizontally movable guide rollers 70 and 71, respectively. The guide rollers 64, 65, 70 and 71 are all preferably of the same diameter and approximately the same size as the centering wheels 62 and 63. Each roller is provided with a V-groove in the peripheral face thereof, the centers of the grooves being substantially aligned with the centers of the flat peripheral faces of their associated wheels and being indicated in Figure 2 by dashed lines 67.

Each of the grooved guide rollers is rotatably mounted on an antifriction bearing (not shown) that is in turn mounted on a stud 72 which extends into the interior of the casing 20 through a slot 73 in the back 25. The studs 72 have squared portions 76 where they pass through the back 25. Elongated washers 77 having corresponding square holes therein are mounted on the studs 72 between the guide rollers and the casing and cover the slots 73 to prevent entrance of dirt therethrough. Each of the washers 77 bears against and slides on a horizontally elongated, flat, raised portion 78 of the back 25 around each of the slots 73. Within the casing 20 each of the studs 72 which carry the guide rollers 64 and 65 is removably attached to a slide 74 and each of the studs 72 which carry the guide rollers 70 and 71 is removably attached to a slide 75 in a manner to be hereinafter set forth.

Extending horizontally outwardly from the back 25 of the casing 20 adjacent each corner thereof is a foot or short rod 80. The feet 80 project beyond the wheels and rollers just described and serve to support the casing in such manner that the wheels are not damaged when the measuring device is laid on its back. Screws 81 passing through the back 25 may be employed to detachably secure the feet 80 to the casing 20.

The interior of the casing 20 is provided with a plurality of partitions, arranged perpendicularly to the back 25, which are preferably cast integrally with the body of the casing. The partition 82 which extends generally vertically within the casing 20 and the horizontal partition 83 together form a compartment, on the left side of the casing as it is viewed in Figure 3, into which there extend through the back 25 of the casing 20 the shafts 86 and 87 of the measuring wheels 68 and 69, respectively. A spur gear 88 is mounted on each of the shafts 86 and 87 adjacent to and spaced from the back 25 by washers (not shown). The gears 88 are held on the shafts for rotation therewith by washers 89 and nuts 90, each of the latter having screw-threaded engagement with the end of one of the shafts.

The teeth of the gear 88 on the shaft 86 are engaged with the teeth of a spur gear 93 of a counter 94 which is supported within the casing 20 on an angle bracket 95 that extends inwardly from the side 23 of the casing 20 to which it is secured by a screw 96. The counter 94 is removably mounted on the bracket 95 by screws 98 and is provided with a dial 99 and a reset knob 100 which extends laterally through the side 23 of the casing 20 into a recessed portion 101 thereof. Intermediate the gears 88 within the casing 20 there is provided a mounting plate 105 which is attached to the back 25 by screws 106. Extending laterally from the mounting plate 105, and preferably formed integrally therewith, is a stationary shaft 107 which supports, through an antifriction bearing 108, a large gear 110 carrying said bearing. The gear 110 is meshed with both of the gears 88 and thereby provides for the rotation of the latter gears, and thus the measuring wheels 68 and 69, in unison.

Adjacent the top 21 and the bottom 22 of the casing 20, above and below, respectively, the gears 88, are a pair of mounting plates 113 secured to the back 25 by screws 114. Studs 116 for supporting the centering wheels 62 and 63 extend through the plates 113 and are secured thereto by nuts 117 having threaded engagement with the ends of the studs.

The right side of the interior of the casing 20, as viewed in Figure 3, is divided into a plurality of compartments by horizontally extending partitions 120, 121, 122 and a diagonally arranged partition 123 all of which are disposed perpendicularly to the back 25. Attached by suitable means to the top and bottom, respectively, of partitions 121 and 122 are horizontal plates 125 which have, respectively, upwardly and downwardly directed flanges 126 at the outer edges thereof. The plates 125 serve to reinforce the partitions and the flanges 126 provide support for the center of the cover plate 27 which is preferably removably fastened thereto by screws 127. Also in the right side of the interior of the casing 20 are the slides 74 and 75, referred to above, which carry the guide rollers 64, 65, 70 and 71. The studs 72 which support the guide rollers pass through the slides 74 and 75 and each carries on its inwardly extending end, a washer or collar 128 which is secured thereon by a screw-threaded nut 129.

The slides 74 and 75 are adapted for horizontal reciprocating movement within the casing 20 parallel to the back 25 of the casing. Each of the slides is guided along the upper and lower edges thereof, respectively, by a pair of horizontal vertically spaced bars 131 and 132. The slides 74 and 75 and the guide bars 131 and 132 are substantially the same in thickness.

As shown most clearly in Figure 4, each of the guide bars 131 and 132 is mounted against a plate 135 which preferably is formed of a material having a low coefficient of friction such as lubricant-impregnated metal and which rests against the inner face of the casing back 25. A similar plate 136 is mounted on the outer faces of each pair of guide bars and is held in place and reinforced by a backing plate 137. Bolts 139 provided with nuts 140 on their inner ends extend inwardly from the outer face of the back 125 through plate 135, guide bars 131 and 132, and plates 136 and 137 to hold the plates and bars in place. Horizontal slots 141, registering with the slots 73 in the back 25 of the casing 20 are provided in the antifriction plates 135 and 136 and in the backing plates 137 to permit reciprocating movement of the studs 72 and the guide rollers 64, 65, 70 and 71 carried thereby.

The slides 74 which carry, through studs 72, the top and bottom guide rollers 64 and 65, respectively, are connected by a long bar 144 which extends vertically within the casing 20 adjacent the side wall 24 thereof. The bar 144, adjacent each end thereof, is pivotally attached to one of the slides 74 as by a pin or rivet 146. In similar manner the slides 75 which carry the intermediate guide rollers 70 and 71 are pivotally attached as by pins or rivets 149 adjacent the ends of a shorter bar 148 that extends vertically within the casing 20 adjacent the partition 82. Neither of the bars 144 or 148 is attached or connected to the casing 20.

A carriage 152 is slidably arranged within the casing 20 between the parallel horizontal partitions 121 and 122. The carriage 152 is provided with rearwardly projecting longitudinal runners 153 at the top and bottom thereof which slidably engage the inner face of the back 25. Also extending longitudinally of the carriage 152 is an internally threaded hole 154. Engaged within the threaded hole 154 is the correspondingly threaded stem 155 of a bevel gear 156. A reduced extension 158 of the gear 156 is rotatably mounted in a sleeve 159 received in a stationary block 160 secured as by screws or bolts 157 between the partitions 121 and 122 adjacent the side wall 24. Engaged with the bevel gear 156 there is provided another bevel gear 161 mounted for rotation around a vertical axis on a stem 162 which extends upwardly through the horizontal partition 121 and the top 21 of the casing 20. A sleeve 164 is mounted in the partition 121 around the stem 162 and a knob or handle 165 is secured, as by means of a pin 166, on the end of the stem 162 that projects outwardly from the casing 20. Since the bevel gears 156 and 161 are in mesh and the gear 156 is restrained from horizontal movement, rotation of the knob or handle 165 produces rotation of the threaded stem 155 of the gear 156 and results in horizontal movement of the carriage 152.

At the rear of the carriage 152 between the runners 153 there are provided a plurality, and preferably a pair, of tension springs 168. Each of the springs 168 is attached at one of its ends to a pin 169 which is securely mounted, as by screw threading, in the carriage 152 and projects rearwardly therefrom. The other ends of the springs 168 are secured to the long vertical bar 144 on opposite sides of and closely adjacent the center of said bar, as by rivets or pins 170. A pair of compression springs 172 are disposed between the tension springs 168 at the rear of the carriage 152. Each of the springs 172 is mounted between and bears against a lug 174, which projects rearwardly from the carriage between the runners 153 and a tab or small plate 175 that is secured as by soldering or welding to the shorter vertical bar 148. The lugs 174 and tabs 175 are each provided with projections 176 extending toward each other within the springs 172 to prevent displacement of the latter. Aligned longitudinal slots 177 are provided in the horizontal partitions 121 and 122 and plates 125 above and below the carriage 152 to receive pins 178 which are removably secured in and project from the top and bottom thereof, thus preventing lateral displacement of the carriage.

As a consequence of the pivoted connection of the bars 144 and 148 to the slides 74 and 75, respectively, and their connection through the springs 168 and 172, respectively, with the carriage 152, rotation of the knob 165 at the top of the casing 20 in one direction to cause horizontal movement of the carriage to the left as viewed in Figure 3 produces corresponding movement of the bars and the slides. This results in the guide rollers 64, 65, 70 and 71 carried by the slides 74 and 75, respectively, being moved horizontally toward the centering wheels 62 and 63 and the measuring wheels 68 and 69. Since the axes of rotation of all of the wheels and guide rollers are parallel and, as previously mentioned, the grooves in the latter are in substantial alignment with the center of the flat peripheral faces of the centering wheels and the measuring wheels, such movement permits firm but resilient gripping of a cable 66 running between the grooved guide rollers and the wheels. Furthermore, although the vertical bars 144 and 148 are not pivoted on the casing 20, the spring connections between these bars and the carriage 152 permit pivotal movement of the bars so that the slides 74 and 75 and the guide rollers carried thereby may have independent horizontal movement and thereby allow cable splices or joints to pass between the rollers and the centering and measuring wheels without damage or slipping.

Reverse rotation of the knob 165 produces movement of the carriage 152 in the opposite direction and results in release of the spring tension and compression yieldably urging the bars 144 and 148, respectively, toward the centering and measuring wheels. As the tension springs 168 become compressed during such movement of the carriage the movement is imparted to the bar 144. The release of the springs 172 from compression, however, does not bring about movement of the bar 148 away from the measuring wheels and accordingly the carriage 152 is provided with a bent finger 180, projecting downwardly and laterally therefrom and attached thereto by screws 181, which positively engages the bar 148 on the edge thereof opposite the tabs 175 and causes it to follow the carriage when the latter is moved horizontally away from the measuring wheels.

In setting up and using the measuring apparatus herein described to measure the depth of a well the latch slide 52 is moved upwardly to permit the handle 42 to be pivoted downwardly and slid through the tubular projections 40 to the position under the housing shown in Figure 8. The measuring apparatus is then placed on the top of the well casing with the legs 41 of the handle 42 on opposite sides of the cable. By movement of the knob 165 the guide rollers 64, 65, 70 and 71 are moved away from the centering wheels and measuring wheels so as to permit the cable 66 to pass between the wheels and the rollers. The knob 165 is then turned in the opposite direction to move the carriage 152 toward the wheels and thereby resiliently engage the guide rollers against the cable in the position shown in Figures 2 and 6 so that the cable is held in position by the V-grooves of the rollers. The tension or force with which the cable is held against the measuring wheels 68 and 69 by the guide rollers 70 and 71 is indicated by the position of a pointer 183, which is mounted as by a screw 184 on the stud 72 of the guide roller 70, with respect to suitable indicia on the indicator plate 185. The latter is supported by a rod 186 that is removably secured to and movable with the carriage 152, a slot 187 being provided in the partition 121 to permit horizontal movement of the rod 186. It will thus be seen that the same predetermined force or tension may be applied to a cable to be measured regardless of the diameter of the cable since the alignment of the pointer 183 with a particular point on the indicator plate 185 indicates at all times the same degree of compression in the springs 172.

When the proper tension has been placed on the cable 66 in the manner described above, the counter 94 is re-set to a zero reading by turning the knob 100. The measuring wheels 68 and 69 and the gears 88 and 93 are preferably so selected with respect to diameter and number of teeth that a reading of one unit on the dial 99 of the counter 94 is produced by movement of each foot of the circumference of the measuring wheels past a given point during rotation. Therefore, the number of feet of cable which have passed over the measuring wheels may be readily ascertained from the dial. The dial 99 and the position of the pointer 183 with respect to indicia on the indicator plate 185 may be readily seen through windows 189 and 190, respectively, in the cover 27 in which there are mounted glass plates 192 and 193, respectively, to exclude dust. By rotation of the knob 165 the tension on the cable can be adjusted as required if observation through the window 193 shows the pointer 183 to be displaced from its proper position with respect to the indicia on the plate 185.

If the cable 66 is carefully paid out through the measuring device, the depth of the well may be readily ascertained by adding to the number of feet of cable which have passed through the measuring device the length of the tool (not shown) carried by the cable and the length of cable between the tool and the measuring wheel 69 when the measuring device was placed in operation. It should be noted that, although the top and bottom guide rollers 64 and 65 and the intermediate guide rollers 70 and 71 are movable radially toward the axes of rotation of the centering wheels 64 and 65 and the measuring wheels 68 and 69, respectively, to hold the cable 66 firmly against the flat peripheral faces of the wheels, those axes are not in a vertical line. The centering wheels being of smaller diameter have their axes placed nearer the center of the casing 20 so that the peripheral faces of all four wheels contacted by the cable 66 lie in the same vertical plane. Consequently, the cable passes through the wheels of the measuring apparatus in a straight line and no inaccuracy resulting from bending or kinking of the cable is introduced into the measurement.

Additional causes of the high degree of accuracy in measurement inherent in measuring apparatus embodying the present invention are the ability of the apparatus to "float" on the cable so that oscillation or whip does not cause slippage, and the novel means provided for permitting maintenance of a predetermined tension on the cable as it passes over the measuring wheels.

It will be seen from the foregoing description that the measuring apparatus of the present invention is sturdy in construction and simple in operation. It is also clear that the measuring apparatus is convenient to use since it may be easily carried from one location to another and may be quickly set up and made ready for use without any supporting or mounting means other than the carrying handle. As pointed out above, the hereindescribed measuring apparatus is, because of novel features incorporated therein, capable of measuring a well cable with a high degree of accuracy so that the depth of wells may be reliably determined. Moreover, the present measuring apparatus is adapted to be used with ropes or cable of widely varying diameters without structural modification and with the same degree of accuracy because of the novel tensioning means provided.

It will be understood that the embodiment of the present invention described herein and shown in the accompanying drawings is capable of considerable change and modification without departing from the spirit of the invention. It is, therefore, desired that the invention should not be considered limited except as required by the following claims.

I claim:

1. In measuring apparatus of the character described, a closed housing, a plurality of wheels rotatably mounted in fixed positions on the exterior of said housing, a guide roller on the exterior of said housing associated with each of said wheels, and a plurality of slides rigidly guided within said housing, each of said slides being movable radially toward and away from the axis of rotation of one of said wheels and having one of said guide rollers rotatably but rigidly carried thereby with its axis of rotation parallel to the axis of rotation of its associated wheel.

2. In measuring apparatus of the character described, a closed housing, a plurality of wheels rotatably mounted in fixed positions on the exterior of said housing, a guide roller on the exterior of said housing associated with each of said wheels, a plurality of slides rigidly guided within said housing, each of said slides being movable radially toward and away from the axis of rotation of one of said wheels and having one of said guide rollers rotatably but rigidly carried thereby with its axis of rotation parallel to the axis of rotation of its associated wheel, and means within said housing resiliently resisting movement of said slides away from said wheels.

3. In measuring apparatus of the character described, a housing, a plurality of wheels rotatably mounted in fixed positions on the exterior of said housing, a guide roller associated with each of said wheels, a plurality of slides within said housing, each of said slides being movable radially toward and away from the axis of rotation of one of said wheels and having one of said guide rollers rotatably carried thereby, a bar within but unconnected to said housing, said bar being pivotally connected to each of said slides, and means within said housing operatively connected to said bar adapted to move each of said slides and the guide roller carried thereby radially with respect to the axis of rotation of their associated wheel.

4. In measuring apparatus of the character described, a housing, a plurality of measuring wheels rotatably mounted in fixed positions on the exterior of said housing, a guide roller associated with each of said measuring wheels, a plurality of slides within said housing, each of said slides being movable radially toward and away from the axis of rotation of one of said measuring wheels and having one of said guide rollers rotatably carried thereby, a bar within but unconnected to said housing, said bar being pivotally connected to each of said slides, and means within said housing operatively connected to said bar adapted to move each of said slides and the guide roller carried thereby radially with respect to the axis of rotation of their associated wheels.

5. In measuring apparatus of the character described, a housing, a plurality of centering wheels rotatably mounted in fixed positions on the exterior of said housing, a guide roller associated with each of said centering wheels, a plurality of slides within said housing, each of said slides being movable radially toward and away from the axis of rotation of one of said centering wheels and having one of said guide rollers rotatably carried thereby, a bar within but unconnected to said housing, said bar being pivotally connected to each of said slides, and means within said housing operatively connected to said bar adapted to move each of said slides and the guide roller carried thereby radially with respect to the axis of rotation of their associated wheels.

6. In measuring apparatus of the character described, a housing, a pair of centering wheels and a pair of measuring wheels rotatably mounted in fixed positions on the exterior of said housing, a plurality of guide rollers each of which is associated with one of said wheels, a plurality of slides within said housing, each of said slides being movable radially toward and away from the axis of rotation of one of said wheels and having one of said guide rollers rotatably carried thereby, a pair of bars within but unconnected to said housing, one of said bars being pivotally connected to the slides carrying the guide rollers associated with said centering wheels, and the other of said bars being pivotally connected to the slides carrying the guide rollers associated with said measuring wheels, and means within said housing operatively connected to at least one of said bars adapted to move the slides connected to said bar and the guide rollers carried by said slides radially with respect to the axis of rotation of their respective associated wheels.

7. In measuring apparatus of the character described, a housing, a plurality of wheels rotatably mounted in fixed positions on the exterior of said housing, a plurality of rotatably mounted guide rollers on the exterior of said housing, one of said guide rollers being associated with each of said wheels, a bar within but unconnected to said housing, said bar being operatively connected at each of its ends to one of said guide rollers, and means within said housing operatively connected to said bar adapted to move said guide rollers radially toward and away from the axes of rotation of their respective associated wheels.

8. In measuring apparatus of the character described, a housing, a plurality of wheels rotatably mounted in fixed positions on the exterior of said housing, a plurality of rotatably mounted guide rollers on the exterior of said housing, one of said guide rollers being associated with each of said wheels and being movable radially toward and away from the axis of rotation of said wheel, a bar within but unconnected to said housing, said bar being operatively connected at each of its ends to one of said guide rollers, means within said housing resiliently resisting movement of said bar and guide rollers, and operating means extending outwardly from said housing adapted to adjust the resistance of said first mentioned means.

9. In measuring apparatus of the character described, a housing, a plurality of wheels rotatably mounted in fixed positions on the exterior of said housing, a guide roller associated with each of said wheels, a plurality of slides within said housing, each of said slides being movable radially toward and away from the axis of rotation of one of said wheels and having one of said guide rollers rotatably carried thereby, a bar within said housing but unconnected thereto, said bar being pivotally connected adjacent each of its ends to one of said slides, a carriage mounted for reciprocation within said housing, said carriage and said slides having parallel paths of movement, and means within said housing operatively connected to said carriage and said bar resiliently resisting movement of said slides away from said wheels.

10. In measuring apparatus of the character described, a housing, a pair of centering wheels and a pair of measuring wheels rotatably mounted in fixed positions on the exterior of said housing, a plurality of guide rollers each of which is associated with one of said wheels, a plurality of slides within said housing, each of said slides being movable radially toward and away from the axis of rotation of one of said wheels and having one of said guide rollers carried thereby, and a pair of bars within said housing but unconnected thereto, one of said bars being pivotally connected to the slides carrying the guide rollers associated with said centering wheels and the other of said bars being pivotally connected to the slides carrying the guide rollers associated with said measuring wheels, a carriage mounted for reciprocation within said housing, said carriage and said slides having parallel paths of movement, and means within said housing operatively connected to said carriage and to each of said bars resiliently resisting movement of said slides away from said wheels.

11. In measuring apparatus of the character described, a housing, a plurality of wheels rotatably mounted in fixed positions on the exterior of said housing, a guide roller associated with each of said wheels, a plurality of slides within said housing, each of said slides being movable radially toward and away from the axis of rotation of one of said wheels and having one of said guide rollers rotatably carried thereby, a bar within said housing but unconnected thereto, said bar being pivotally connected adjacent each of its ends to one of said slides, a carriage mounted for reciprocation within said housing, said carriage and said slides having parallel paths of movement, and means within said housing operatively connected to said carriage and said bar resiliently resisting movement of said slides away from said wheels, said means comprising a spring.

12. In measuring apparatus of the character described, a housing, a plurality of wheels rotatably mounted in fixed positions on the exterior of said housing, a guide roller associated with each of said wheels, a plurality of slides within said housing, each of said slides being movable radially toward and away from the axis of rotation of one of said wheels and having one of said guide rollers rotatably carried thereby, a bar within said housing but unconnected thereto, said bar being pivotally connected adjacent each of its ends to one of said slides, a carriage mounted for reciprocation within said housing, said carriage and said slides having parallel paths of movement, means within said housing operatively connected to said carriage and said bar resiliently resisting movement of said slides away from said wheels, and means adapted to cause reciprocation of said carriage.

13. In measuring apparatus of the character described, a housing, a pair of centering wheels and a pair of measuring wheels rotatably mounted in fixed positions on the exterior of said housing, a plurality of guide rollers each of which is associated with one of said wheels, a plurality of slides within said housing, each of said slides being movable radially toward and away from the axis of rotation of one of said wheels and having one of said guide rollers rotatably carried thereby, a pair of bars within said housing but unconnected thereto, one of said bars being pivotally connected to the slides carrying the guide rollers associated with said centering wheels and the other of said bars being pivotally connected to the slides carrying the guide rollers associated with said measuring wheels, a carriage mounted for reciprocation within said housing, said carriage and said slides having parallel paths of movement, and means within said housing resiliently resisting movement of said slides away from said wheels, said means comprising a tension spring attached to said carriage and one of said bars and a compression spring mounted between said carriage and the other of said bars.

14. In measuring apparatus of the character described, a housing, a pair of centering wheels and a pair of measuring wheels rotatably mounted in fixed positions on the exterior of said housing, a plurality of guide rollers each of which is associated with one of said wheels, a plurality of slides within said housing, each of said slides being movable radially toward and away from the axis of rotation of one of said wheels and having one of said guide rollers rotatably carried thereby, a pair of bars within said housing but unconnected thereto, one of said bars being pivotally connected to the slides carrying the guide rollers associated with said centering wheels and the other of said bars being pivotally connected to the slides carrying the guide rollers associated with said measuring wheels, a carriage mounted for reciprocation within said housing, said carriage and said slides having parallel paths of movement, means within said housing resiliently resisting movement of said slides away from said wheels, said means comprising a tension spring attached to said carriage and one of said bars and a compression spring mounted between said carriage and the other of said bars, and means operable from the exterior of said housing adapted to cause reciprocation of said carriage.

15. In measuring apparatus of the character described, a housing, a plurality of wheels rotatably mounted in fixed positions on the exterior of said housing, a guide roller associated with each of said wheels, a plurality of slides within said housing, each of said slides being movable radially toward and away from the axis of rotation of one of said wheels and having one of said guide rollers rotatably carried thereby, a bar within said housing but unconnected thereto, said bar being pivotally connected adjacent each of its ends to one of said slides, a carriage mounted for reciprocation within said housing, said carriage and said slides having parallel paths of movement, means comprising a spring within said housing operatively connected to said carriage and said bar resiliently resisting movement of said slides away from said wheels, and means for indicating the force exerted by said spring comprising a pair of cooperating elements, one of said elements being carried by said carriage and the other of said elements being carried by one of said slides.

16. In measuring apparatus of the character described, a housing, a pair of centering wheels and a pair of measuring wheels rotatably mounted in fixed positions on the exterior of said housing, a plurality of guide rollers on the exterior of said housing, each of said guide rollers being associated with one of said wheels and being rotatably carried within said housing by a slide, each of said slides being movable radially toward and away from the axis of rotation of the wheel associated with the guide roller carried thereby, a pair of bars within said housing but unconnected thereto, one of said bars being pivotally connected adjacent its ends to the slides carrying the guide rollers associated with said centering wheels and the other of said bars being pivotally connected adjacent its ends to the slides carrying the guide rollers associated with said measuring wheels, means within said housing resiliently resisting movement of said slides away from said wheels, and means operable from the exterior of said housing adapted to produce reciprocation of said slides, said centering wheels and said measuring wheels having flat peripheral faces aligned to produce straight line movement of a cable held in contact with said faces of said guide rollers.

17. In measuring apparatus for cables, lines and the like adapted for quick application to a cable at any point thereof, the combination of a closed housing, a plurality of wheels on the exterior of said housing mounted in fixed positions for rotation about parallel axes, and a plurality of guide rollers on the exterior of said housing, one of said guide rollers being associated with and movable radially toward and away from the axis of each of said wheels to thereby permit the insertion of a cable between said wheels and said guide rollers and contact of said cable by said wheels and said guide rollers, each of said guide rollers being rigidly but rotatably mounted to maintain its axis of rotation parallel to that of its associated wheel.

18. In measuring apparatus for cable, lines and the like adapted for quick application to a cable at any point thereof, the combination of a closed housing, a pair of spaced centering wheels on the exterior of said housing mounted in fixed positions for rotation about parallel axes, a pair of spaced measuring wheels on the exterior of said housing mounted in fixed position between and spaced from said centering wheels, and a plurality of guide rollers on the exterior of said housing, one of said guide rollers being associated with and movable radially toward and away from the axis of each of said wheels to thereby permit the insertion of a cable between said wheels and said guide rollers and contact of said cable by said wheels and said guide rollers, each of said guide rollers being rigidly but rotatably mounted to maintain its axis of rotation parallel to that of its associated wheel.

EDWARD F. MOSER.

References Cited in the file of this patent

UNITED STATES PATENTS

| Number | Name | Date |
|---|---|---|
| 910,787 | Crow | Jan. 26, 1909 |
| 1,078,462 | Rapson | Nov. 11, 1913 |
| 1,267,271 | Richardson | May 21, 1918 |
| 1,417,021 | Bevel | May 23, 1922 |
| 1,651,643 | St. Clair | Dec. 6, 1927 |
| 2,079,908 | House | May 11, 1937 |
| 2,136,457 | Nixon | Nov. 15, 1938 |
| 2,163,402 | Mason | June 20, 1939 |
| 2,194,307 | Jackson | Mar. 19, 1940 |
| 2,232,956 | Mathey | Feb. 25, 1941 |
| 2,386,284 | Wynn | Oct. 9, 1945 |
| 2,401,576 | Mason | June 4, 1946 |
| 2,448,238 | Stehl | Aug. 31, 1948 |